Patented Aug. 13, 1946

2,405,861

UNITED STATES PATENT OFFICE 2,405,861

PRODUCTION OF ALGINATE SOLUTIONS

Charles William Tod, Kingswinford, Brierley Hill, England, assignor to Albright & Wilson Limited, Oldbury, near Birmingham, England, a British company No Drawing. Application September 11, 1942, Serial No. 458,064. In Great Britain September 19, 1941

10 Claims. (Cl. 252—316)

This invention comprises improvements in or relating to the production of alginate solutions. Alginates are capable of forming very viscous solutions or jellies which on account of their physical properties are valuable in various connections, and it is an object of the invention to facilitate the production of aqueous solutions, including under the term "solutions" jellies, dispersions and emulsions containing alginates.

It is well known that alkaline-earth alginates are insoluble in water. By the term "alkaline earth alginates" in this connection is meant the alginates of the metals properly and strictly called alkaline earth metals, viz., calcium, barium, and strontium. Magnesium and beryllium do not fall into this category (although sometimes loosely called alkaline earth metals). They differ in many ways from the true alkaline earth metals and magnesium alginate is not insoluble in water. As a result of the insolubility of alkaline earth alginates, although alginic material is usually separated from seaweed in the form of the calcium salt, it has hitherto been necessary to convert it into the sodium salt or other soluble alginate in order to utilise the properties of the alginates in forming viscous solutions and gels. If it were possible to bring the calcium salt directly into solution instead of first converting it into the sodium salt this would obviate the steps connected with the conversion of the material.

It has, of course, been known for some time that certain sodium salts, such as the carbonate and the sesqui-carbonate, will react with calcium alginate to give viscous solutions, but these are opaque because of the presence of an insoluble salt, such as calcium carbonate.

It has now been found it is possible to produce directly from alkaline-earth alginates, clear viscous solutions or gels, by the use of certain compounds capable of sequestering alkaline-earth ions. Such salts are known in themselves; for example it is known that sodium hexametaphosphate can sequester calcium ions and, for example, prevent calcium carbonate or the like from being precipitated out of solution in water by the use of soap. (See Schwartz and Gilmore, "Industrial & Engineering Chemistry" vol. 26, page 999.)

According to the present invention a process of preparing the solution of an alkaline-earth alginate is characterised by introducing into the solvent salts capable of sequestering alkaline-earth ions, so as to assist solution.

It has been found that sodium hexametaphosphate and sodium tripolyphosphate ($Na_5P_3O_{10}$) are effective for the purpose. These salts may be described as molecularly dehydrated alkali metal polyphosphates. They have the property of forming stable complex ions with alkaline earth ions.

Surprisingly, in view of the fact that it has only a feeble power of sequestering calcium ions, sodium citrate has also been found valuable in this connection.

It is possible, within the scope of the invention, to use an alkali alginate such as sodium alginate along with the calcium alginate to help to take the calcium alginate into solution. While in this case the use of sodium alginate is not altogether avoided, the quantity employed is reduced as compared with the use of sodium alginate as the sole source of alginate in preparing alginate solutions.

The following examples show by way of illustration specific methods of carrying the invention into effect:

Example I

An example of the method of using the invention is the preparation of a glycerin hand jelly. This can be made by dissolving sodium citrate in water, adding glycerin and a preservative, and then stirring in the calcium alginate, which is preferably finely ground. With the correct concentrations a jelly will form in a few hours. 20 grams of sodium citrate dissolved in 1 litre of water with 800 c. c. glycerin is sufficient to deal with 30 grams of calcium alginate.

Example II

The following is an example of the preparation of an emulsion:

Sodium citrate is dissolved in water to which has been added a preservative. Calcium alginate is stirred in until completely dissolved, and the desired quantity of oil is then added. After further stirring, the resulting mixture is passed through a homogeniser when it will be found to give a stable emulsion.

Thus 7.5 gms. of finely powdered calcium alginate are dissolved in a solution of 7.5 gms. sodium citrate in 250 ccs. of water. 5 gms. of soya bean oil are stirred into the resulting viscous solution and the product is subsequently passed through a homogeniser.

Example III

The following is an example where sodium alginate and calcium alginate are employed together:

10 gms. sodium alginate are dissolved in 1 litre of water and 15 grams calcium alginate are added with stirring. A jelly is formed in a short time.

These preparations can be used as the basis of cosmetic or pharmaceutical jellies and, when the nature of the compound used for reacting with the calcium alginate permits, food jellies and emulsions can also be made.

I claim:

1. A process of preparing a solution of an alkaline earth alginate comprising the steps of introducing into an aqueous solvent sequestering salts chosen from the group consisting of molecularly dehydrated alkali metal polyphosphates and alkali citrates and thereafter introducing alkaline-earth alginate and forming stable complex ions therefrom by the action of the sequestering salts thereon.

2. A process of preparing a jelly containing an alkaline-earth alginate wherein an aqueous solution is made containing a salt capable of sequestering alkaline earth ions and selected from the group consisting of molecularly dehydrated alkali metal polyphosphates and alkali citrates, thereafter the alkaline-earth alginate is dispersed in the solution in quantity sufficient to form a jelly, and the solution thus produced is allowed to stand until gelled.

3. Preparations containing alkaline-earth alginate, as produced by a process as claimed in claim 2.

4. A process as claimed in claim 1, wherein the salt employed is sodium hexametaphosphate.

5. A process as claimed in claim 1, wherein the salt is sodium citrate.

6. A process as claimed in claim 2, wherein the salt employed is sodium citrate in a proportion of about two-thirds that of the alginate.

7. A process for the preparation of a glycerine hand jelly which comprises dissolving sodium citrate in water, adding glycerine and a preservative, then stirring in finely ground calcium alginate, and then allowing the mass to stand until a jelly is formed.

8. A process for preparing a jelly which comprises dissolving about 20 grams of sodium citrate in about 1 litre of water, adding about 800 c. c. of glycerine, then stirring in about 30 grams of calcium alginate, and allowing the mass to stand until a jelly is formed.

9. A process for the preparation of an emulsion which comprises the steps of dissolving sodium citrate in water to which has been added a preservative, stirring in a quantity of calcium alginate until it is completely dissolved, then adding the desired quantity of oil, stirring the mixture, and passing it through a homogeniser.

10. The method of preparing an emulsion which comprises dissolving about 7.5 grams of finely powdered calcium alginate in a solution of about 7.5 grams of sodium citrate in about 250 c. c. of water, stirring in about 5 grams of soya bean oil and passing the product through a homogeniser.

CHARLES WILLIAM TOD.